United States Patent Office 3,427,182
Patented Feb. 11, 1969

3,427,182
PIGMENT SEALING COATS
Joel Ronald Zingerman, Monroe, N.Y., assignor to American Cyanamid Company, Stamford, Conn., a corporation of Maine
No Drawing. Filed May 12, 1965, Ser. No. 455,326
U.S. Cl. 117—72       5 Claims
Int. Cl. B44d 1/16

ABSTRACT OF THE DISCLOSURE

Pharmaceutical tablets are first coated with a sealing coat, which may be in a number of layers, which coat is either opaque or colored and is not transparent. This coat is formed of a water insoluble resin, such as shellac, dissolved in a suitable solvent, such as a lower alcohol. The sealing coat may either be colored or opaque and the tablet is then covered with film coats of water soluble or dispersible film forming substances, usually with certified dyes or pigments.

Background of the invention

Pharmaceutical tablets which contain either a medicament or an inert material to produce a placebo have frequently been colored in order to enhance their appearance and also, in the case of tablets of materials which are colored and which are non-uniform in appearance, to mask any apparent imperfections. The outer colored coats may either be sugar coats or so-called film coats, which employ film-forming materials in organic solvents or mixed oragnic solvents and water. It is with improved film-coated colored products that the present invention deals.

When film coating is to be used, it is customary to apply to the compressed tablets a preliminary sealing coat using a water insoluble resin such as, for example, shellac or other resin which is pharmaceutically acceptable. The sealing coat is for the purpose of preventing solvents from the film coating solution from penetrating the tablet, effects of atmospheric moisture, increased abrasion resistance and the like.

With ordinary sealing coats, which are of course at least translucent, a relatively large number of coats of the colored film coating composition are often required in order to hide imperfections in the tablet itself. This is undersirable as the amount of dye used builds up, and although when using certified dyes, the toxicity of which is fairly low, dangerous concentrations may not occur if the color is relatively light, the toxicity of the soluble dyes is not zero and there has been considerable concern in recent years on the part of the Food and Drug Administration because in certain instances very large amounts of certified dyes have produced undesirable effects. Accordingly, rather stringent limitations on the amount of dye permitted have been set and, of course, even if a colored tablet falls within the limitations, it is never desirable to have more dye than is necessary.

Summary of the invention

The present invention solves the above problems by making an opeque or colored sealing coat. In such a case a relatively small number of colored film coats becomes necessary and a deep rich color is obtained with complete masking of any color or other non-uniformities in the tablet base. The sealing coat according to the present invention may have opacifying agents, such as titanium dioxide. It may have a soluble dye, a pigment or, of course, it may have mixtures.

It is an advantage of the present invention that standard coating processes may be used which normally involve tumbling the tablets in a coating pan and applying a number of shots of the coatings to be applied, first the sealing coat, then the film forming coats. The present invention does not significantly change the actual procedure of coating which is an advantage as it does not require special equipment or the learning of new techniques.

Description of the preferred embodiments

The invention will be described in greater detail in conjunction with the specific examples, which are typical illustrations of different kinds of colored pharmaceutical tablets.

EXAMPLE 1

About 35,000 ⅜″ standard concave tablets of tetracycline hydrochloride were placed in an 18″ coating pan. A sealing composition was prepared by blending 30 grams of titanium dioxide into 500 ml. 4 lb. cut confectionary glaze (shellac solution), with the aid of a Waring Blendor. The tablets were maintained at 60° C. at all times and after each shot were dried by blowing warm air over them. The sealing coat was applied in three shots, the first using 100 ml., the second 60 ml., and the last 50 ml., with ten minutes drying time between each shot. Also, after each shot kaolin was added to reduce stickiness.

A film coating formula was then prepared having the following composition:

| | |
|---|---|
| 10 centipoise methylcellulose _____grams__ | 150 |
| Alcohol _____ml__ | 2000 |
| Chloroform _____ml__ | 1500 |
| 600 molecular weight polyethylene glycol _grams__ | 30 |
| Distilled $H_2O$ _____do____ | 150 |
| D. & C. Yellow No. 11 Dye _____do____ | 3 |

The above film coating formula was applied to the tablets by spraying in 30 applications of 15 ml. each at the rate of 1 ml. per second. Drying was effected between each coating. The final tablet, after polishing, had a deep yellow color; there was excellent coverage, and no evidence of spotted cores through the film.

EXAMPLE 2

About 20,000 ⅜″ tetracycline hydrochloride tablets were placed in an 18″ coating pan. The tablet cores had a uniform yellow color. 800 mg. of D. & C. yellow dye No. 11 were dissolved in 400 ml. of confectionary glaze, as in Example 1, and a sealing coat was produced with two shots of 50 ml. each, with a ten minute drying time between shots and application of kaolin dust to prevent stickiness.

The seal coated tablets were then colored with the film coating composition of Example 1 but with the D. & C. yellow dye omitted. 25 applications were made as described in Example 1, and after polishing the tablets showed a uniform color coating with no spots showing on the tablet surface.

EXAMPLE 3

4 kg. of 1 ³⁄₃₂″ extra deep concave dicalcium phosphate tablets were placed in an 18″ coating pan. 15 grams of D.&C. yellow No. 5 lake was milled with a roller mill and added to 500 ml. of confectionary glaze, as used in Example 1. The suspension was applied in two shots, 100 ml. in the first shot and 80 ml. in the second, with a drying time of ten minutes between each shot and with the addition of kaolin to prevent stickiness. This produced a colored sealing coat.

1 kg. of tablets were transferred to an 8″ coating pan kept at 60° C. The film coating formula was as follows:

| | | |
|---|---|---|
| 10 centipoise methylcellulose | grams | 75 |
| Alcohol | ml | 1000 |
| Chloroform | ml | 750 |
| 600 molecular weight polyethylene glycol | ml | 15 |
| Distilled $H_2O$ | ml | 75 |
| D. & C. Yellow Dye No. 11 | ml | 1.5 |

A total of 15 applications of 5 ml. each were sprayed onto the tablets, with intermediate drying. The resulting tablets after polishing were uniformly coated, the color was intense and there were no spots showing through to the surface of the tablets.

EXAMPLE 4

The procedure of Example 3 was repeated except that no yellow pigment was added to the confectionary glaze for the sealing coat and the number of film coats was 25 instead of 15 of Example 3. After polishing, the tablets were uniform in color but very light in intensity. It will be noted that the dicalcium phosphate is not colored as were the tetracycline tablets and, therefore, the problem of uniform color was relatively simple. However, a larger number of applications was required and even then the color was much lighter. In order to obtain the same depth of color, a much larger number of applications would be needed, which would build up an undesirably high concentration of dye on the final tablets.

I claim:

1. A method of coloring tablets of granulated, compressed material to form a core, which comprises coating the core with a sealing coat of a water insoluble resin and a substance selected from the group consisting of soluble physiologically acceptable dyes, a physiologically acceptable pigment, and a white opacifying agent, and coating the seal coated tablets with a reduced number of film coatings from a solution of a partially water soluble film forming substance in solvents including organic solvents.

2. A method according to claim 1 in which the film coating solution contains a coloring agent.

3. A process according to claim 1 in which the insoluble resin dispersion is a shellac solution.

4. A method according to claim 3 in which the sealant composition is a dispersion of titanium dioxide.

5. A method according to claim 2 in which both the sealant coating and the film coatings contain a dye as coloring agent.

References Cited

UNITED STATES PATENTS

| | | | |
|---|---|---|---|
| 3,043,747 | 7/1962 | Long | 167—82.8 |
| 3,149,038 | 9/1964 | Jefferies | 167—82 |
| 3,149,040 | 9/1964 | Jefferies | 167—82 |
| 3,297,535 | 1/1967 | Butler et al. | 167—82.8 |

OTHER REFERENCES

Gross et al., Drug and Cosmetic Ind., February 1960, p. 171.

RALPH S. KENDALL, *Primary Examiner.*

U.S. Cl. X.R.

167—82